May 4, 1926.

W. A. STARCK

AUTOMOBILE BUMPER BRACKET

Original Filed June 29, 1923

1,583,504

INVENTOR
William A. Starck
By
Atty.

Patented May 4, 1926.

1,583,504

UNITED STATES PATENT OFFICE.

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE BUMPER BRACKET.

Application filed June 29, 1923, Serial No. 648,450. Renewed March 16, 1926.

*To all whom it may concern:*

Be it known that I, WILLIAM A. STARCK, a citizen of the United States, residing at Milwaukee, in the county of Milwaukee and State of Wisconsin, have invented new and useful Improvements in Automobile Bumper Brackets, of which the following is a specification.

This invention relates to an automobile bumper bracket.

An object of the invention is to provide a simple and efficient bracket which may be readily attached to the side bar of an automobile frame and adjusted to support the bumper bar in the required position.

Another object thereof is to provide a bracket which will be held in a fixed position when it is attached to the side bar.

According to this invention, the bracket is provided with two supporting arms which are adapted to be fastened to the side bar of an automobile frame at different places along the same, and which are pivotally or otherwise connected to enable either arm to have its position adjusted vertically relative to the other arm.

These arms mutually brace each other and thereby hold the bracket in a rigid position.

The accompanying drawings illustrate a bracket made in accordance with this invention.

Figure 1:
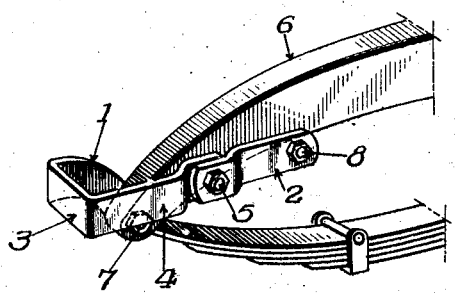
Fig. 1 is an outside perspective view of the bracket attached to the side bar.
Figure 2:
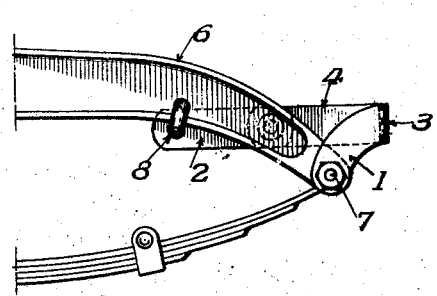
Fig. 2 is an inside elevation of the bracket.

The bracket is provided with a forward supporting arm 1 and a rear supporting arm 2 which cooperate to support a yoke 3.

The yoke is adapted to have attached thereto a bumper bar.

The forward supporting arm is directly connected to the yoke in a fixed position and extends downwardly.

The rear supporting arm is connected to an intermediate arm 4 by a pivot bolt 5.

The intermediate arm is connected to the yoke in a fixed position and it is arranged parallel to the forward supporting arm and apart therefrom.

The yoke, the forward supporting arm, and the intermediate arm, are preferably made in a single piece.

The forward supporting arm has its free attaching end provided with a hole for receiving a fastening bolt.

The pivot bolt which connects the rear supporting arm to the intermediate arm is arranged above the free attaching end of the forward supporting arm.

The rear supporting arm has its free attaching end provided with a hole for receiving a fastening bolt.

Either supporting arm may be turned vertically on the pivot bolt to adjust its position relative to the other arm.

When the bracket is attached to the side bar 6 of an automobile frame, its supporting arms are arranged on opposite sides thereof and they are fastened thereto at different places along the same.

As they occupy different angular positions they brace each other vertically and thereby hold the bracket in a rigid vertical position.

As they are arranged apart, they brace each other laterally and thereby hold the bracket in a rigid transverse position.

The forward supporting arm is usually attached to the side bar first and adjusted to support the bumper bar in the required position.

The rear supporting arm is then adjusted vertically and fastened to the side bar.

Of course, either supporting arm may be attached to the side bar first, as each arm may be turned on the pivot bolt to adjust its position relative to the other arm.

The supporting arms may be locked or fastened in a definite relation to each other by the pivot bolt.

The supporting arms may have their relative positions adjusted before the bracket is attached to the side bar.

The forward supporting arm may be fastened to the side bar by the spring bolt 7.

The rear supporting arm may be fastened to the side bar by a hook bolt 8, applied to the lower flange thereof.

Figure 3:
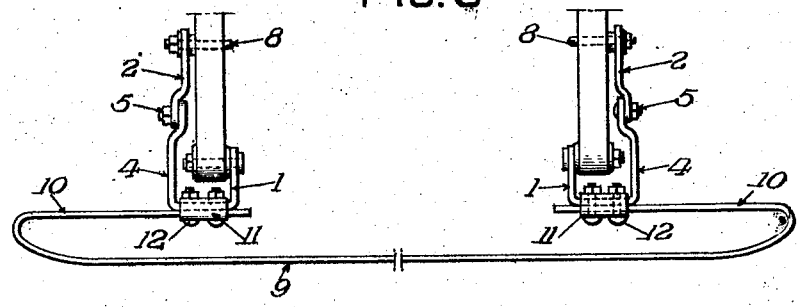
Fig. 3 is a plan view of a bumper provided with the brackets illustrated in Figs. 1 and 2.

Figure 3 illustrates a bumper in which the bracket is employed to support a spring bumper bar 9.

This bumper bar has rear supporting bars 10 which are attached to the bracket by clamps 11 arranged on the yokes thereof and having tightening bolts 12.

Figure 4:
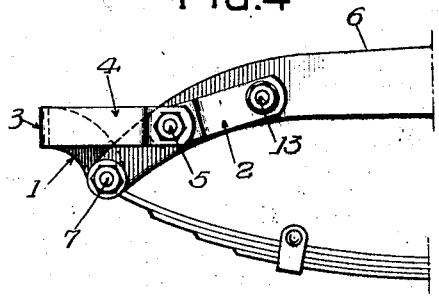
Fig. 4 is a side elevation of the bracket having its rear supporting arm fastened to the web of the side bar.

The bracket illustrated in Figure 4 has the rear supporting arm fastened to the side bar by a bolt 13 passing through the web thereof.

Figure 5:
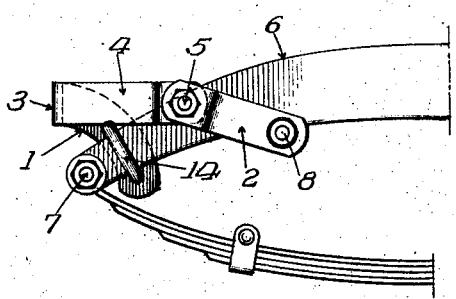
Fig. 5 is a side view of the bracket having the forward supporting arm fastened to the side bar by a U-bolt.

The bracket illustrated in Figure 5 has the forward supporting arm fastened to the side bar by a U-bolt 14.

Figure 6:
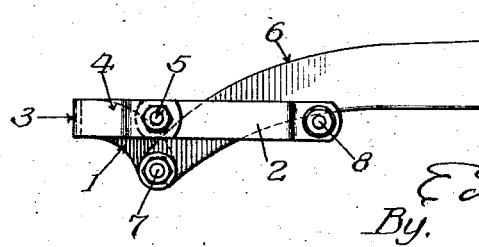
Fig. 6 is a side view of the bracket modified to provide a longer rear supporting arm.

The bracket illustrated in Figure 6 has a longer rear supporting arm and a shorter intermediate arm than the bracket in Figure 1.

Of course, the invention which has been herein set forth may be embodied in various forms which will be within the following claims.

The invention is hereby claimed as follows:

1. An automobile bumper bracket adapted to be attached to the side bar of an automobile frame, comprising two supporting arms adapted to cooperate to support a bumper bar in a fixed vertical position and pivotally connected together to enable either arm to be turned vertically to adjust its position relative to the other arm.

2. An automobile bumper bracket adapted to be attached to the side bar of an automobile frame, comprising a supporting arm, a yoke having said arm connected thereto in a fixed position, and an adjustable supporting arm connected to said yoke to cooperate with the aforesaid arm to support the same and adapted to have its position vertically adjusted relative to the aforesaid arm.

3. An automobile bumper bracket adapted to be attached to the side bar of an automobile frame, comprising a supporting arm adapted to have attached thereto a bumper bar, and a pivoted supporting arm extending further rearward than the aforesaid supporting arm and cooperating therewith to support said bumper bar.

4. An automobile bumper bracket adapted to be attached to the side bar of an automobile frame, comprising a supporting arm adapted to have attached thereto a bumper bar, another supporting arm cooperating therewith to support said bumper bar and extending further rearward than the aforesaid arm, and a pivot on which either arm may turn vertically to adjust its position relative to the other arm.

5. An automobile bumper bracket adapted to be attached to the side bar of an automobile frame, comprising a supporting arm, a yoke having said arm connected thereto in a fixed position, another supporting arm cooperating with said first arm to support said yoke and arranged apart therefrom, and a pivot on which either arm may turn vertically to adjust its position relative to the other supporting arm.

6. An automobile bumper bracket adapted to be attached to the side bar of an automobile frame, comprising a supporting arm, a connecting yoke having said arm connected thereto in a fixed position and adapted to have a bumper bar attached thereto, and another supporting arm connected to said yoke and extending further rearward than the first supporting arm, and a pivot on which either may turn vertically to adjust its position relative to the other supporting arm.

7. An automobile bumper bracket adapted to be attached to the side bar of an automobile frame, comprising a forward supporting arm, an intermediate arm arranged apart therefrom, a yoke having said arms connected thereto in a fixed position in relation to each other, a rear supporting arm, and a pivot bolt connecting said rear supporting arm to said intermediate arm.

8. An automobile bumper bracket adapted to be attached to the side bar of an automobile frame, comprising a forward supporting arm, an intermediate supporting arm arranged apart therefrom, a yoke having said arms connected thereto in a fixed position, a rear supporting arm extending further rearward than said forward supporting arm, and a pivot bolt connecting said intermediate supporting arm and said rear supporting arm.

9. An automobile bumper bracket adapted to be attached to the side bar of an automobile frame, comprising a forward supporting arm, a rear supporting arm, a yoke having one of said arms connected thereto in a fixed position, and a pivotal connection between the other arm and said yoke.

10. An automobile bumper bracket adapted to be attached to the side bar of an automobile frame, comprising a forward supporting arm having a free depending attaching end, an intermediate arm arranged apart from said forward supporting arm, a yoke having said supporting arm and said intermediate arm connected thereto in a fixed position in relation to each other, a rear supporting arm extending further rearward than said forward supporting arm and having a free attaching end, and a pivot bolt connecting said rear supporting arm to said intermediate arm.

In witness whereof, I have hereunto subscribed my name.

WILLIAM A. STARCK.